United States Patent [19]

Bolliand

[11] 4,259,400

[45] Mar. 31, 1981

[54] FIBROUS PADDING MATERIAL AND PROCESS FOR ITS MANUFACTURE

[75] Inventor: Robert Bolliand, Lyons, France

[73] Assignee: Rhone-Poulenc-Textile, Lyons, France

[21] Appl. No.: 21,607

[22] PCT Filed: Fep. 8, 1979

[86] PCT No.: PCT/FR78/00001

§ 371 Date: Feb. 8, 1979

§ 102(e) Date: Feb. 8, 1979

[87] PCT Pub. No.: WO 78/00012

PCT Pub. Date: Dec. 21, 1978

[51] Int. Cl.[3] .......................... B32B 5/26; B32B 5/28

[52] U.S. Cl. .................................. 428/288; 428/296; 428/301; 428/374; 428/378; 428/391; 428/394; 428/395

[58] Field of Search ................ 428/288, 296, 299-302, 428/374, 378, 391, 394, 395

[56] References Cited

U.S. PATENT DOCUMENTS

| | | | |
|---|---|---|---|
| T869,020 | 12/1969 | Kim | 57/156 |
| 2,705,498 | 4/1955 | Johnson | 428/224 X |
| 2,705,686 | 4/1955 | Ness et al. | 428/288 X |
| 3,655,420 | 4/1972 | Tichenor | 428/391 |
| 3,715,878 | 2/1973 | Kim | 57/24 X |
| 3,935,046 | 1/1976 | Kiernan et al. | 428/288 X |
| 3,968,283 | 7/1976 | Schutte | 428/296 |
| 4,198,461 | 4/1980 | Keller | 428/288 X |

FOREIGN PATENT DOCUMENTS

| | | |
|---|---|---|
| 1111140 | 7/1961 | Fed. Rep. of Germany . |
| 456845 | 9/1913 | France . |
| 19049 | 9/1914 | France . |

*Primary Examiner*—Harold Ansher
*Attorney, Agent, or Firm*—Sherman & Shalloway

[57] ABSTRACT

A fibrous padding material simulating natural down for quilted articles.

The material is in the form of an element of defined length and of low thickness relative to its width, which element comprises a central filiform core which is relatively dense and rigid compared with the whole of the material and to which are bonded fibers which are oriented substantially transversely relative to this core, the said fibers being entangled with one another so as to form a homogeneous thin web and being located on either side of the core, substantially in the same plane (FIG. 3).

Process for the manufacture of the material, in which a fibrous web is formed in a known manner, a plurality of spaced-out heat-weldable thread is superposed onto at least one of the faces of the said web, the spaced-out threads are caused to bond to the fibrous web, the web is divided into strips on either side of each thread and, finally, said strips, thus formed, are cut into elements of defined length (FIG. 1). The division of the web into strips is preferably performed by passing the threads through eyelets after the threads have been combined with the fibrous web. The web can also be divided by cutting (FIG. 1).

2 Claims, 5 Drawing Figures

FIBROUS PADDING MATERIAL AND PROCESS FOR ITS MANUFACTURE

Figure 1:
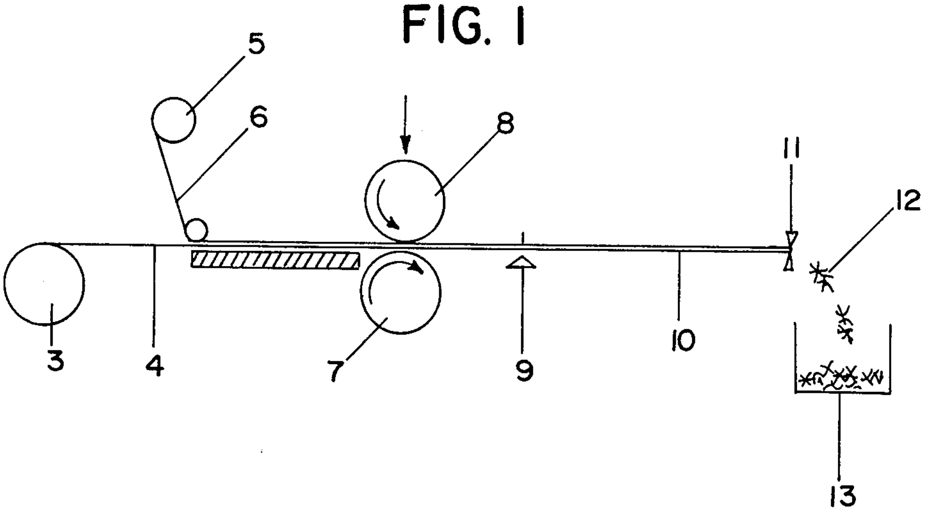

The present invention relates to a novel padding or filling material which can in particular be used for the production of quilted or stuffed articles, such as bedding articles and various garments such as dressing gowns, parkas, quilted cloaks and the like.

Quilted or stuffed articles have been known for a long time and essentially consist of an external envelope, in general based on a woven or knitted fabric, which contains an internal layer consisting of feathers and/or of various natural or synthetic fibers in the form of webs.

In general, it is required that padding materials make it possible to obtain a bulky structure of low weight having a high insulating capacity, satisfactory air permeability and excellent elasticity, which allows the whole to resume its bulky structure when the article is subjected to successive loads and load releases.

These requirements are difficult to meet simultaneously and in general the filling materials are selected in accordance with the articles produced. This is also shown clearly in the article which appeared in the review "Textiles Chimiques" of July/August, 1969, pages 373–379.

Traditionally, quilted products have been produced in the past from natural materials such as cotton, wool, kapok and feathers. For some years past, it has been proposed to replace the natural fibers with synthetic materials such as, in particular, polyester fibers or the like. It has also been proposed to produce padding webs directly from tows of synthetic threads, by spreading out the filaments of which these tows consist and treating them so as to impart to them bulk and cohesion.

However, in the case of articles where the requirements are high bulk, as low a weight as possible, a high heat insulating capacity and air permeability, it must be recognised that hitherto only natural feathers have given good results. It is obvious that this material is available in a limited amount and consequently the articles produced are expensive. It has indeed been proposed to mix natural feathers with a certain proportion of synthetic fibers to reduce the cost and increase the amount of material available, but it must be recognised that these solutions have not given good results because, on the one hand, these mixtures are difficult to produce, and, on the other hand, the characteristics of the products obtained are not comparable with those imparted to the product by using only natural feathers.

There has now been found, and it is this which forms the subject of the present invention, a new type of padding material which is economical, can be manufactured in unlimited amount, overcomes these disadvantages and makes it possible to produce articles whose properties are comparable to those achieved by using natural feathers.

The new padding material according to the invention is based on fibrous material and is characterised in that it is in the form of an element of defined length and of low thickness relative to its width and length, which element consists of a central filiform core or ridge, which is relatively dense and rigid compared with the whole of the material, and to which are bonded fibers which are oriented substantially transversely relative to the core and are entangled with one another, so as to form a homogeneous thin web, said fibers being located on either side of the core.

This padding material which imitates natural feathers can schematically be considered as consisting of a flexible filiform textile rod, on either side of which are arranged textile fibers, forming barbs, which adhere to the rod.

The invention also relates to a process for the manufacture of such products.

The process according to the invention consists schematically in forming, in a known manner, a fibrous web consisting of fibers entangled with one another, for example a carded web or the like, and is characterised in that there is superposed onto the web thus formed, and onto at least one face thereof, a plurality of spaced-out yarns with a heat-weldable material base, after which said spaced-out threads are bonded to the web, the web is then divided into strips on either side of the spaced-out threads and finally said strips are cut to a defined length.

Advantageously, the spaced-out threads are bonded to the web under the combined action of heat and pressure, for example by passing between two heating rollers.

The division of the web into strips is performed by any appropriate means; in general, a means of cutting located on either side of the threads is used. However, it can happen that, depending on the weight of the fibrous web, some fibers of said web will not stick to the threads and will thus interfere with the proper functioning of the process after the cutting into strips. Thus, another means of separation has been proposed, which is characterised in that after sticking the spaced-out threads onto the fibrous thin web by heat/pressure, the division of the resulting web into strips on either side of each thread is performed naturally by tearing, by passing each of these threads through an eyelet, with the fibers passing through the eyelet through which the thread to which they adhere most firmly passes.

The use of a single layer of threads superposed on the fibrous web is generally very suitable for weights of the fibrous web ranging up to 50 grams per square meter; beyond this, the number of fibers which stick diminishes and it is therefore proposed to place the fibrous web between two layers of spaced-out threads, these two layers being staggered relative to one another by half a space; in practice, all the fibers are thus stuck to one or other layers of threads under the influence of heat combined with pressure, and the separation into strips is performed either by cutting between each thread or naturally by passing the threads through eyelets which also serve as cleaning devices. These eyelets may have any desired shape, such as oval or round; however, it is important that their diameter should preferably be less than the space separating two threads. These eyelets are in general mounted on rails which are themselves held by a frame, so that the eyelets are arranged in the same way as for holding the warp threads on a weaving loom. Advantageously, the core consists of a thread based on a heat-weldable material, or of a thread which has been rendered heat-weldable by coating.

The textiles used are artificial and/or synthetic. The textile of the rod is either a monofilament or a multifilament, a double thread or a thread sheathed with another thread; it may have a core/sheath structure, the sheath consisting of a polymer with low melting point. It is also possible to deposit a heat-weldable product of the hot-melt type on the surface by coating or sheathing the thread. Preferably, this thread is made up by combining to threads having different temperatures at which they become sticky, for example with one thread based on a copolyamide which becomes sticky at about 120°-140° C., and another based on polyamide 6—6. The thread of the rod can optionally be crimped or wavy.

The fibrous material bonded to the central core consisting of the above-mentioned thread advantageously consists of synthetic fibers, such as polyester fibers, of natural fibers or of artifical fibers, used individually or in the form of mixtures, having the same gauge or different gauges, the same cross-section or different cross-sections, and the same staple length or different staple lengths.

To avoid, as far as possible, the formation of lumps or bundles of fibers in the prepared textile articles containing the padding material which forms the subject of the parent application, it is preferred to employ fibers having at most 5 waves per centimeter for the formation of the thin web.

If fibers are used which have been subjected to a silicone elastomer type treatment, it may be difficult to cause the heat-weldable threads to stick; in this case, the latter threads are coated with a silicone material and dried, preferably at about 180° C., this coating and drying being carried out prior to their being deposited on the fibrous web, and either continuously with the latter operation or batch-wise. The application of heat and pressure at the instant of carrying out the process, either by means of a plate or on a calender, then makes it possible to stick the threads and the silicone-treated fibers together.

The padding materials which form the subject of the present application can be all of the same size, or of different sizes. Thus, they can be of different lengths. They can also be of different widths; this is achieved by not spacing the threads out uniformly, or by spacing them out uniformly, but at spacings of different magnitudes. A varied padding material is thus obtained, and mixing of products of different sizes can only increase the comfort provided by the material.

It is possible, before dividing the product into strips, to dye it, for example by transfer/printing.

After sticking and before dividing into strips, where the latter is performed by passing through eyelets, slight brushing can be carried out to ruffle the fibers and remove the superfluous, unstuck, fibers which are deposited on a cleaning roller of the type known in spinning. Where the product is divided into strips by cutting, the brushing/cleaning operation can take place after cutting into strips and before cutting into elements of defined length.

Figure 2:
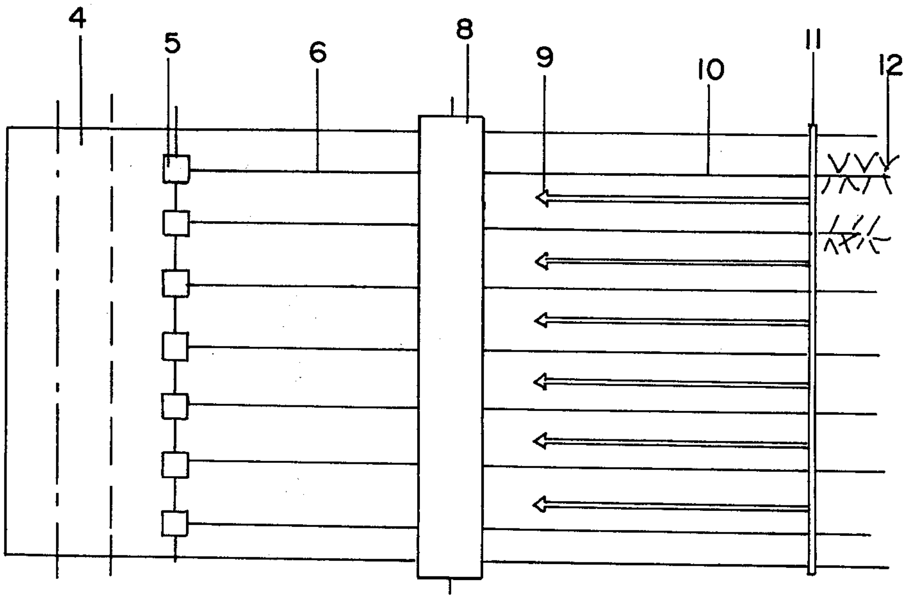

The invention and the advantages which it provides will, however, be better understood with the aid of the example of an embodiment, given below and illustrated by the accompanying drawings in which:

FIGS. 1 and 2 schematically illustrate, in side view and in top view, a device which permits the manufacture of the product according to the invention.

Figure 3:
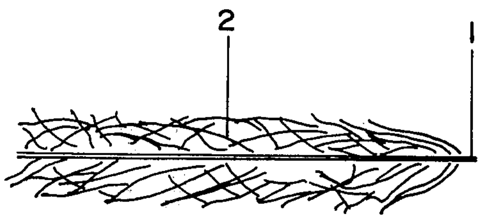
Figure 4:
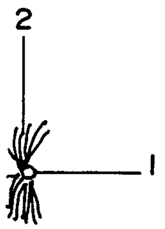

FIGS. 3 and 4 show, respectively in top view and in side view, the new padding material according to the invention.

Figure 5:
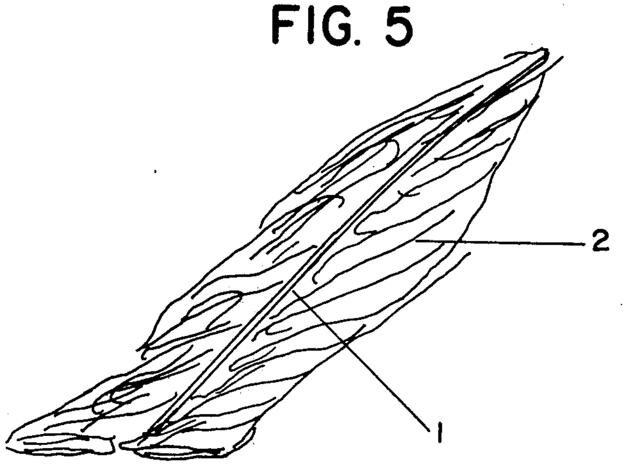

FIG. 5 schematically illustrates, in perspective, a material of this type.

As can be seen in FIGS. 3, 4 and 5, the new padding material according to the invention is in the form of an element of defined length, of low thickness relative to its length, and consisting essentially of a filiform central core 1, which is relatively dense and rigid compared with the whole of the material and to which are bonded fibers 2 which are oriented substantially transversely relative to this core 1, the said fibers being entangled with one another and forming a homogeneous thin web. These fibers 2 are arranged on either side of the core 1.

If desired, to accentuate the resemblance to natural feathers, it is possible, as is shown in FIG. 5, to taper the end of the material.

The manufacture of such a material is achieved in a simple manner, as illustrated in FIGS. 1 and 2. A fibrous web 4 is produced in a known manner, for example by means of a carding machine, a pneumatic apparatus of the Curlator type, or some equivalent. Onto this web 4 is superposed a plurality of spaced-out heat-weldable threads 6, supplied, for example, from individual bobbins 5. The threads 6 are uniformly spaced-out on the said web 4. They are caused to bond to the surface of the web 4 by passing between heating rollers 7-8. This bond is produced by virtue of the heating rollers 7-8. Advantageously, these rollers exert a pressure which favors the bonding of the two constituents. The combination is cut continuously, by knives 9 arranged on either side of the threads 6, to form strips 10, after which the said strips are cut, for example by knives 11, so as to obtain elements 12 of defined length, which are collected in a storage unit 13.

The padding material which forms the subject of the present application is used on the same equipment as that employed for natural feathers.

The padding material which forms the subject of the present application is employed for padding and quilting of bedding articles (pillows, bolsters, eiderdowns, bedspreads, coverlets and the like), clothing and furnishings, for the manufacture of garments, in decoration, in millinery and for heat insulation and sound insulation.

The examples which follow illustrate the present application without limiting it.

EXAMPLE 1

A web weighing 50 b/square meter is produced from polyethylene glycol terephthalate fibers of 3.3 dtex gauge and 45 mm staple length, possessing 3 waves per centimeter. Onto said fibrous web, thus produced, is superposed a web of threads each consisting of a polyethylene glycol terephthalate monofilament of diameter 24/100 mm twisted together, at 100 turns per meter, with a polyethylene monofilament; the threads are spaced-out in the web at 20 mm from one another.

Calendering the combination of fibrous web/web of threads causes the polyethylene to melt and the fibers of the web to adhere to the threads. The strips are formed by passing each thread through a round eyelet of 15 mm diameter, with the fibers passing through the eyelet through which passes the thread to which they adhere best. The speed of travel of the combination is 6 meters/minute; the strips thus produced have a mean width of 15 to 20 mm. These strips are then cut transversely by knives into elements of 10 centimeters length, and are collected in a receptacle.

EXAMPLE 2

A fibrous web weighing fifty grams per square meter (50 g/$m^2$) and having a width of 1.5 meters is produced on a pneumatic apparatus of the Curlator type from polyester fibers of gauge 3.3 dtex and staple length 40 mm, having 4 waves per centimeter. The web thus formed is wound in the form of a roll 3.

Onto the web 4 thus formed are superposed threads produced from a heat-weldable material and consisting of the combination of a thread based on a copolyamide, for example, based on polyamide 66/6 or 66/10, which becomes sticky at between 120° and 140° C., and a thread of polyamide 6—6. These two threads are combined at 60 turns/meter and the total gauge of the combined thread is 600 dtex.

The threads 6 are spaced-out at 15 mm from one another.

The threads 6 are stuck to the web 4 by passing between two heating rollers 7-8 which are heated to a temperature of 140° C., the upper roller exerting a pressure of 10 killograms per square centimeter. The speed of travel of the combination is 5 m/minute.

After firmly fixing the threads 6 to the web 4, the combination thus formed is cut by knives 9 located on either side of the threads 6. In this way, strips 10 having a width of 15 mm and possessing a continuous thread 6 in their central part are produced. These strips are then cut by knives 11 into elements of defined length.

The article obtained thus possesses a filiform central core or ridge 1 which is relatively dense and rigid, to which are bonded fibers 2 which form a homogeneous thin web and which are substantially oriented relative to this transverse core.

Such an article is particularly suitable for padding materials, as a replacement for natural feathers. It makes it possible to impart to the articles produced properties comparable with previous articles produced from natural feathers, especially in respect of the bulk and the insulating capacity. It is economical to produce and easy to store. Furthermore it has the advantage that it can be used, in the form in which it is obtained, on conventional equipment which permits the manufacture of padded articles using natural feathers.

It will be clearer that this article can also be used in the form of a web after conversion on appropriate equipment and in particular on pneumatic equipment of the Rando type.

I claim:

1. A new feather-like padding material for quilted articles, based on fibrous material, in the form of an element of defined length and of low thickness relative to its width, which element comprises a central filiform core, which is relatively dense and rigid compared to the whole of the material and to which are bonded fibres which are oriented substantially transversely relative to this core, the said fibres having fewer than 5 waves per centimeter and being entangled with one another so as to form a homogeneous thin web and being located on either side of the core, substantially in one and the same plane, the said core being formed of an ordinary thread combined with a heat-weldable thread.

2. Padded textile articles, containing, at least in part the padding material of claim 1.

* * * * *

UNITED STATES PATENT AND TRADEMARK OFFICE

CERTIFICATE OF CORRECTION

PATENT NO. : 4,259,400

DATED : March 31, 1981

INVENTOR(S) : Robert Bolliand

It is certified that error appears in the above—identified patent and that said Letters Patent is hereby corrected as shown below:

Page 1, item [22] should read as follows:

PCT filed: June 2, 1978

Page 1, please insert the following priority data:

French application N°. 77/18112 filed June 8, 1977
French application N°. 78/15176 filed May 19, 1978

Signed and Sealed this

*Fourth* Day of *August 1981*

[SEAL]

*Attest:*

GERALD J. MOSSINGHOFF

*Attesting Officer* *Commissioner of Patents and Trademarks*